United States Patent [19]

Knize

[11] Patent Number: 5,317,348
[45] Date of Patent: May 31, 1994

[54] FULL COLOR SOLID STATE LASER PROJECTOR SYSTEM

[76] Inventor: Randall J. Knize, 25 19th Ave., Apt. A., Venice, Calif. 90291

[21] Appl. No.: 983,873

[22] Filed: Dec. 1, 1992

[51] Int. Cl.$^5$ .......................... G03B 21/28; H04N 9/31
[52] U.S. Cl. ....................................... 353/31; 353/37; 359/48; 348/750; 348/760
[58] Field of Search .................... 353/122, 30, 31, 33, 353/34, 37, 81, 82; 359/40, 48; 358/60, 231, 232, 61, 241

[56] References Cited

U.S. PATENT DOCUMENTS

| 3,569,988 | 3/1971 | Schmidt et al. | 358/60 |
|---|---|---|---|
| 3,818,129 | 6/1974 | Yamamoto | 358/60 |
| 3,961,334 | 6/1976 | Whitby et al. | 353/20 |
| 3,992,718 | 11/1976 | Driskell | 358/61 |
| 4,145,712 | 3/1979 | Spooner | 358/60 |
| 4,345,258 | 8/1982 | Tsai et al. | 353/31 |
| 4,720,747 | 1/1988 | Crowley | 358/231 |
| 4,833,528 | 5/1989 | Kobayashi | 358/60 |
| 4,835,601 | 5/1989 | Kobayashi | 358/60 |
| 4,851,918 | 7/1989 | Crowley | 358/60 |
| 4,871,231 | 10/1989 | Garcie, Jr. | 358/3 |
| 4,978,202 | 12/1990 | Yang | 358/231 |
| 5,136,426 | 8/1992 | Lindeu et al. | 358/60 |

OTHER PUBLICATIONS

'Laser display technology', Charles E. Baker, IEEE Spectrum Dec. 1968.
'Television Display Using Acoustic Deflection and Modulation of Coherent Light' by Korpel et al, App. Optics, vol. 5, Oct. 10, 1966.
'3W CW Laser Diodes Operating at 633 nm', Geels et al, Elec Lett., 92.
'High Performance 634 nm InGaP/InGaALP Strained Quantum Well Lasers' by Chang-Hasnarn et al, Elect. Lett., vol. 27, Aug. 17, 1991.
'Blue and Green diode lasers in Zn-Se based quantum wells' by H. Jeon et al, Appl. Phys. Lett. 60(17) Apr. 27, 1992.
'CMFL Versatile blue-green laser diodes and efficient LEDs in ZnSe-based quantum wells' H. Jeon et al., CLEO, 32, 92.
'85% efficiency for CW frequency doubling from 1.08 to 0.54 µm' by Z. Y. Ou et al, Optics Letters, vol. 17, No. 9, May 1, 1992.
'Efficient second-harmonic conversion of CW single freq. Nd:YAG laser light by freq. locking to a monolithic ring freq. doubler' by H. Berstenberger et al., Optics Letters/vol. 16, No. 13, Jul. 1991.
Articles, 'World News: Lasers', Laser Focus World, Apr. 1990.
'Tunable Green Upconversion Erbium Fibre Laser' by Allain et al., Electronic Letters, vol. 28, No. 2. Jan 16, 1992.
'CW Room Temp Upconversion Lasing at Blue, Green & Red Wavelengths in Infrared-Pumped Pr Doped Fluoride Fibre' Electronic Letters, vol. 27, 13, Jul. 4, 1991.
'Single-Mode InGaAs-GaAs Laser Diodes Op at 980 nm', Electronic Letters, vol. 27, p. 539, Mar. 14, 1991.
'Narrow Lorentzian Linewidths in 980 nm strained--quantum-well lasers' by S. R. Chinn et al., Electronic Letters, vol. 28, p. 1125, Jun. 1992.

(List continued on next page.)

Primary Examiner—William A. Cuchlinski, Jr.
Assistant Examiner—William C. Dowling
Attorney, Agent, or Firm—Monty Koslover, Assoc.

[57] ABSTRACT

This invention uses various solid-state semiconductor lasers along with frequency doublers as needed to achieve the required three-color light beam wavelengths for input to available light combiners and to a state-of-the-art scanner. The scanner projects a color laser beam to a screen or other equipment. A number of alternate solid-state laser means are described, each combination providing the required light output. Use of the described solid-state lasers instead of the commonly used gas lasers results in considerable savings in required electrical power, cooling and system size.

20 Claims, 4 Drawing Sheets

OTHER PUBLICATIONS

'Room Temp, continuous wave, 946 nm Nd:YAG laser pumped by laser-diode arrays and intracavity freq. doubling to 473 nm by Risk & W. Lenth, Optics Letter, vol. 12, No. 12, Dec. 1987.

'Diode-pumped Nd:YAG lasers at 946 nm', Laser Focus World, Mar. 1990.

'Pump-resonant excitation of the 946 nm Nd:YAG Laser' by J. P. Guthbertson & Dixon, Optics Letters vol. 16, No. 6, Mar. 1991.

'Blue continuously pumped upconversion lasing in TM:YLiF$_4$' by T. Hebert et al., Appl. Phys. Lett. 60(21) May 1992.

'CW Room-Temperature Blue Upconversion Fibre Laser' S. G. Grubb et al., Electronic Letters, vol. 28, p. 1243, Jun. 1992.

FULL COLOR SOLID STATE LASER PROJECTOR SYSTEM

BACKGROUND OF THE INVENTION

1. Field of the Invention

This invention relates to a color laser system that can be utilized for laser projection of television, video pictures, computer generated pictures or other information on small or large screens. In particular, the invention relates to the type of lasers used in the system.

2. Description of the Prior Art

Shortly after the demonstration of the laser in 1960, there were several demonstrations of projection of video images using laser systems. Descriptions of these laser displays can be found in the following references:

1. Baker, Charles E., IEEE Spectrum p 39 (1968), "Laser Display Technology".
2. Koppel, A. et al, Applied Optics p 1667 (1966), "A Television Display using Acoustic Deflection and Modulation of Coherent Light".

Various laser display systems and devices are described in the following U.S. Patents:

3. Stavis, G., U.S. Pat. No. 3,507,984, Apr. 21, 1970, "Laser Multicolor Television Display Apparatus".
4. Korpel, A., U.S. Pat. No. 3,524,011, Aug. 11, 1990, "Laser Color Display Utilizing Acoustical Light Modulators".
5. Baker, C. E., U.S. Pat. No. 4,549,800, Dec. 22, 1970, "Laser Display".
6. Pinnow, D. A. and Van Ultert, Le Grand G., U.S. Pat. No. 3,691,482 Sep. 12, 1972, "Display System".
7. Yamamoto, M., U.S. Pat. No. 3,818,129, Jun. 18, 1974, "Laser Imaging Device".
8. Driskell, C., U.S. Pat. No. 3,992,718, Nov. 16, 1976, "Color Panoramic Laser Projector".
9. Spooner, A. M., and Lobb, D. R., U.S. Pat. No. 414,572, Mar. 20, 1979, "Laser Elimination of Mode Beating".
10. Whitby, C. M., U.S. Pat. No. 4,297,723, Oct. 27, 1981, "Wide Angle Laser Display System".
11. Shortle, M. C., and Lobb, D. R., U.S. Pat. No. 4,613,201, Sep. 23, 1986, "Light Projection Apparatus".
12. Crowley, R. P., U.S. Pat. No. 4,720,747, Jan. 19, 1988, "Sequential Plane Projection By Laser Video Projector".
13. Kobayashi, K., U.S. Pat. No. 4,833,528, May 23, 1989, "Color Video Projecting Apparatus Using Acousto-Optical Deflector".
14. Crowley, R. P., U.S. Pat. No. 4,851,918, Jul. 25, 1989, "Sequential Plane Projection By Laser Video Projector".
15. Yang, K. Y., U.S. Pat. No. 4,978,202, Dec. 18, 1980, "Laser Scanning System for Displaying Three-Dimensional Color Image".
16. Linden, P. A., and Pease, R. W., U.S. Pat. No. 5,136,426, Aug. 04, 1992, "Laser Projection Apparatus".

The foregoing patents and papers demonstrate that high definition full color television projection of images can be accomplished using laser based systems. In particular, the use of modulators, scan systems and associated electronics have been fairly well developed. However, these laser systems have significant limitations, a primary limitation being the lack of availability of the lasers in a suitable small efficient form.

Requirements on the laser sources are as follows for a full color system:

a) A red laser with a proximate wavelength of 610 to 640 nm.
b) A green laser with a proximate wavelength of 510 to 540 nm.
c) A blue laser with a proximate wavelength of 460 to 480 nm.

These particular wavelengths are required in order to achieve full color in the projection of color images. Additional requirements are that the lasers produce at least a fraction (1/10) of a watt so that a suitable luminosity or brightness can be produced. Ideally, the lasers should be small, efficient and inexpensive. Most designs use continuous wave (CW) lasers to simplify the timing.

Several different lasers have been utilized, the most common choice being an Argon ion laser for the blue and green components, and a Krypton or He Ne or Argon pumped dye laser for the red light. Other possible lasers include the He Cd laser and a pulsed copper vapor laser.

The major problem with the forementioned lasers is that they have a very low electrical input to light conversion efficiency, typically less than 0.1%. This means that they require large amounts of electrical power input to the system (typically more than 10 Kw) and also the removal of large heat loads, usually by water cooling. The laser systems also, as a result, tend to be relatively large. Thus their use is generally limited to applications suitable for large, immobile and expensive equipment. It would therefore be desirable to provide a laser projection system which uses lasers that are efficient, small in size and relatively inexpensive, permitting the laser system to be used for a host of applications where small size is a paramount requirement.

SUMMARY OF THE INVENTION

This invention uses various diode or semiconductor lasers along with other diode-pumped solid state lasers and frequency doubling to achieve the required light wavelengths for input to a scanner. A number of alternate laser means are described, each providing the required light output. The solid-state lasers have a high electrical to light conversion efficiency and are small in size, requiring relatively little electrical power and cooling as compared with the lasers commonly used.

Accordingly, it is an object of the present invention to provide a laser projection system which is small in size and relatively efficient in power conversion to light.

Advantages include: an improvement in efficiency over existing lasers by greater than 100 to 1; a great reduction in laser cooling requirements, eliminating the need to be connected to external cooling water; for a given laser output, a reduction in overall size by 50% or more, permitting use in home televisions and other appliances, and possible operation from a standard 110 Vac electrical power outlet.

Further objects and advantages of the present invention will become apparent from the study of the following portion of the specification, the claims and the attached drawings.

DESCRIPTION OF THE PREFERRED EMBODIMENT

Laser projectors can display video and other images on small to large screens with high resolution and contrast, and with a wide depth of focus. These capabilities allow achievement of a number of exciting display features such as high definition TV (HDTV) and projection of new visual concepts such as virtual reality. Possible applications include entertainment venues, military control rooms, air traffic control, flight simulation, movie theaters, projection television including home television, color copying and printing. The application used by the proposed laser projection system will depend primarily on the light power output of the proposed solid-state lasers.

Figure 1:
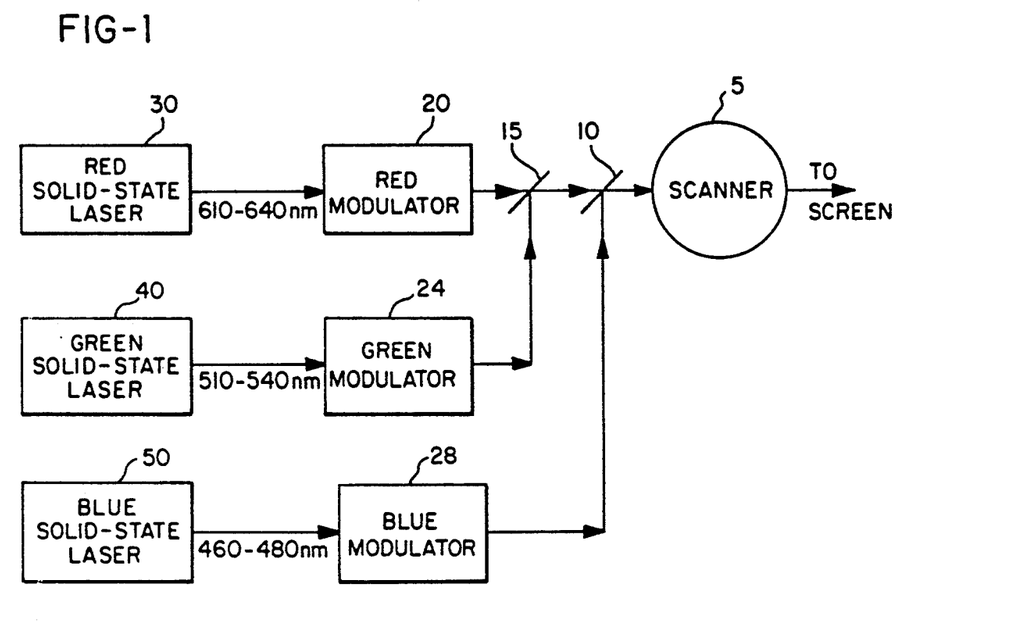
FIG. 1 is a block diagram of the preferred embodiment of the invention solid-state color laser projector system.

Refer to FIG. 1, which is a block diagram of the invention laser projection system which utilizes all solid-state lasers. The system comprises a scanner means 5, a first combiner means 10, a second combiner means 15, a red light modulator means 20, a green light modulator means 24, a blue light modulator means 28, a red solid-state laser means 30, a green solid-state laser means 40 and a blue solid-state laser means 50.

The output of each laser means is connected to the input of its corresponding color light modulator means, producing three separate parallel laser channels: a red laser, a green laser and a blue laser. The laser outputs of the red light modulator 20 and the green light modulator 24 are directed at a second combiner means 15, where the light beams are combined and the resulting beam is directed at a first combiner means 10. The laser output of the blue light modulator 28 is directed at a first combiner means 10 where it is combined with the red/green, and the resulting combination of red, green and blue laser light is directed to a scanner means 5. The scanner means 5 operates to produce a laser beam output for the screen or other equipment.

A conventional scanner means 5 may be used in the present invention. Scanner means have been described in detail in the technical literature and variations disclosed in U.S. Pat. Nos. 4,613,201; 4,511,245 and 4,979,030 which are incorporated by reference herein for all purposes. Similarly, conventional combiner means 10, 15 and light modulator means 20, 24, 28, have been described in the technical literature and disclosed in U.S. Pat. Nos. 5,136,426; 3,818,129 and 3,524,011 which are incorporated by reference herein.

The novel element in the proposed laser projector system is the use of solid-state laser means to produce red, green and blue colors. This generally requires a combination of solid-state components to form a laser source for each of the three colors and is now described.

Referring again to FIG. 1, it is seen that while there is some flexibility in determination of the laser means color wavelengths, high efficiency, full color display dictates the use of the following proximate wavelengths; Red around 610–640 nm, Green around 510–540 nm and Blue around 460–480 nm. Outputs in these wavelengths are produced by the proposed solid-state lasers shown in FIGS. 2, 3a–3d, and 4a–4d.

Figure 2:
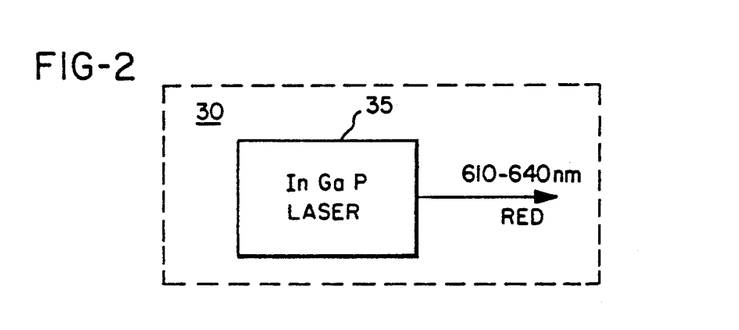
FIG. 2 is a block diagram of an embodiment of a red solid-state laser means for the present invention.

A red laser is shown in FIG. 2 for the red solid-state laser means 30. It would be a CW type, Indium/Gallium/Phosphor (In Ga P) diode laser 35 operating at around 630 nm or in the range of 610–640 nm. Output powers approaching one watt have been recently demonstrated for this laser and are described by R. S. Geels et al in "Electronic Letters" 28 p 1043 (92), and by C. J. Chang-Husnain et al. in "Electronic Letters" 27 p 1553 (92).

There are four alternate methods of generating the green laser means 40. These are illustrated in FIGS. 3a–3d. The first method shown in FIG. 3a utilizes a Zinc/Selenium (Zn Se) diode laser 41, operating at 510–530 nm wavelength. CW operation of 0.5 watts output has been demonstrated for this laser at liquid nitrogen temperatures, and pulsed operation at room temperature. This is described by H. Jeon et al in "App. Phy. Lett." 60, p 2045 (92), and in "Conference on Lasers and ElectroOptics (CLEO)" p 32 (92), and also by H. Cheng et al in CLEO p 34 (92). It is expected that higher power output and room temperature CW operation will be available shortly.

Figure 3A:
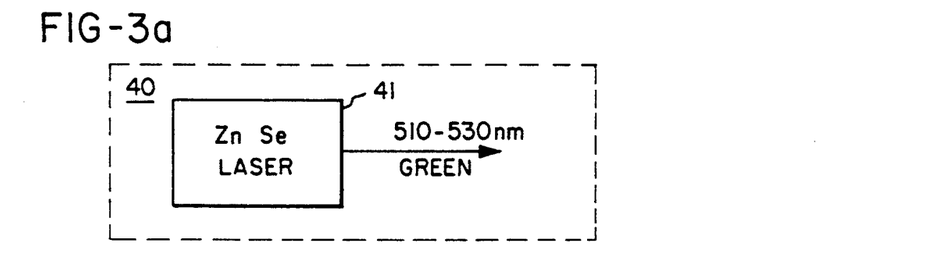
FIGS. 3a thru 3d are block diagrams of four alternate embodiments of a green solid-state laser means for the present invention.
Figure 3B:
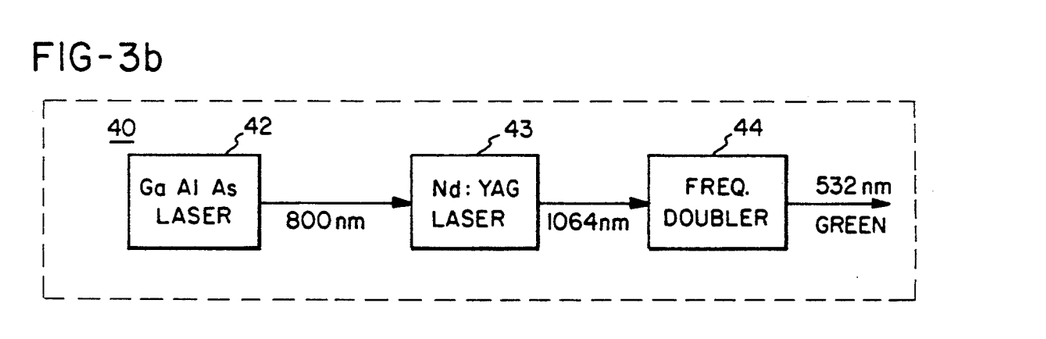

A second alternate method of providing a green laser light is shown in FIG. 3b. This uses a Gallium/Aluminum/Arsenic (Ga Al As) diode laser 42 operating at around 800 nm to pump a Neodymium/Yttrium/Aluminum/Garnet (Nd: YAG) laser 43 which operates at 1064 nm. The 1064 nm light from the Nd: YAG laser 43 is frequency doubled by a doubler external cavity 44 to produce 532 nm wavelength green light. The frequency doubling technique has been extensively demonstrated and described in the laser and optical technical literature in recent years. A conversion efficiency of 85% has been demonstrated and more than 0.5 watts output is available at present, with higher outputs expected shortly. This is described by Z. Y. Ou et al., "Optics Letters", 17 p 640 (1992) and by D. C. Gerstenberger et. al., "Optics Letters" 16, p 992 (1991).

Figure 3C:
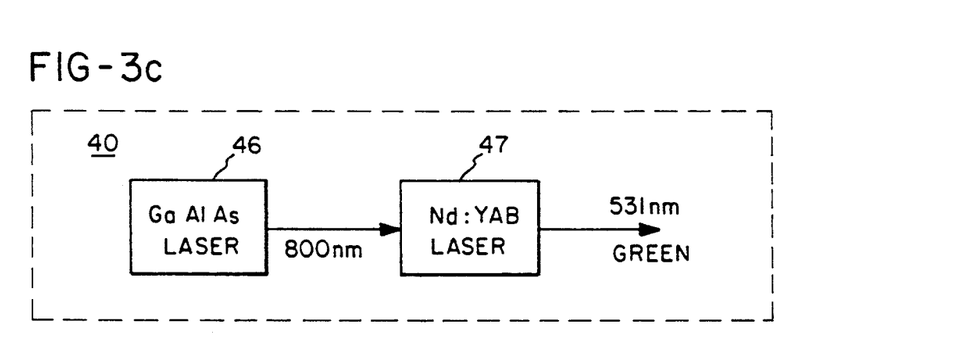

A third alternate method of providing a green laser light 40 is shown in FIG. 3c. In this approach, a Ga Al As diode laser 46 operating at 800 nm is used to pump a Neodymium/Yttrium/Aluminum/Borate (Nd: YAB) laser, which self-frequency doubles to produce a 531 nm green light. This is described in "Laser Focus World", p 27, April 1990.

Figure 3D:
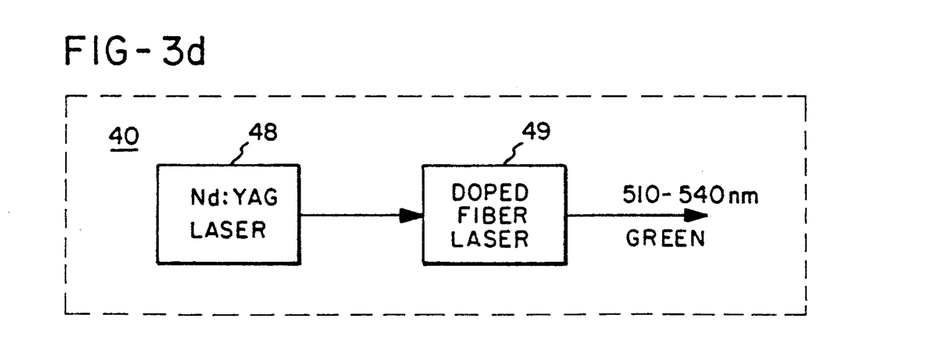

The fourth alternate method of providing a green laser light 40 is shown in FIG. 3d. This method uses a doped fiber laser 49 which is pumped by a diode-pumped Nd: YAG laser 48 to produce a 510–540 nm green light. As a further variation, a diode may be used to pump the doped fiber laser 49 in place of the Nd: YAG laser 48.

The fiber laser 49 comprises glass fiber doped with a suitable lanthanide such as Praseodymium (Pr), Erbium (Er) or Thulium (Tm) for example. A green CW laser using lanthanide doped glass fibers has been demonstrated and described by J. W. Allain et al in "Electronics Letters" 28 p 111 (1992), and R. G. Smart et al in "Electronics Letters" 27 p 1307 (1991).

Figure 4A:
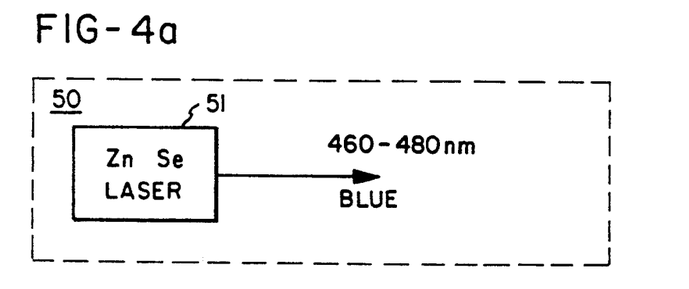
FIGS. 4a thru 4d are block diagrams of four alternate embodiments of a blue solid-state laser means for the present invention.

Similarly to the green laser, there are four alternate methods of providing the solid-state blue laser means 50. The four methods are shown in the block diagrams of FIGS. 4a–4d. The first method for producing a blue laser light as shown in FIG. 4a, uses a Zn Se diode laser 51 made to operate around 460–480 nm. This is the same component as that described earlier for a green laser in FIG. 3a, except for the wavelength operation.

Figure 4B:
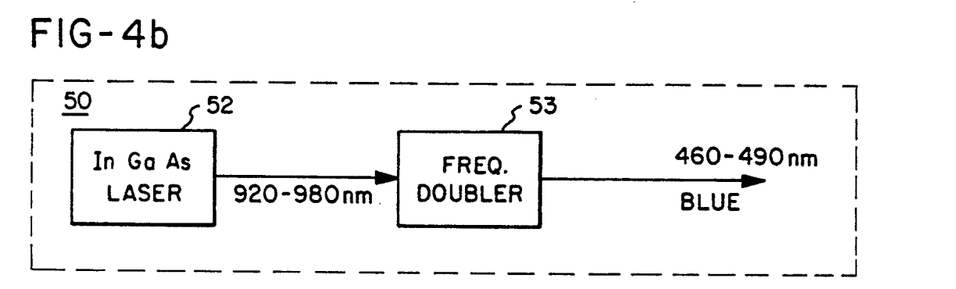

A second alternate method of providing a blue laser light is shown in the FIG. 4b block diagram. An Indium/Gallium/Arsenic (In Ga As) diode laser 52 is used, operating around 920-980 nm. The 920-980 nm wavelength is processed by a frequency doubler 53 to produce 460-490 nm blue light. High power In Ga As diode lasers have been demonstrated and are described by J. S. Major et al in "Electronics Letters", V 27, p 539 (91) and by S. R. Chinn et al in "Electronics Letters", V 28, p 1175 (92).

Figure 4C:
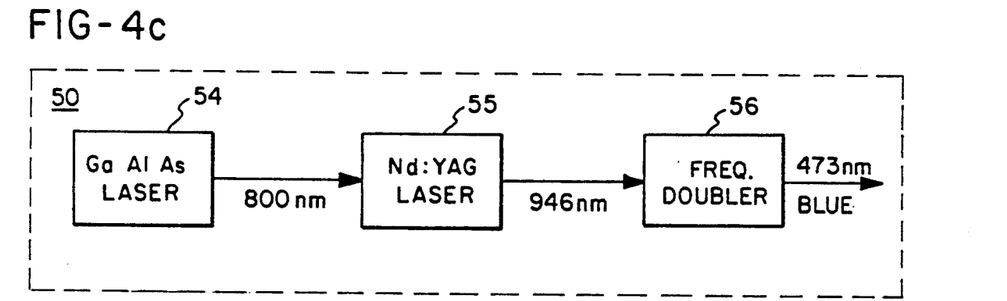

The third alternate method of producing a blue laser light is shown in the FIG. 4c block diagram. This method uses a Ga Al As diode laser 54 which outputs 800 nm light, to pump a Nd: YAG laser 55 that lases at 946 nm. The 946 nm infrared light is then frequency doubled by a doubler 56 to produce 473 nm blue light. This technique has been described in the technical literature by several people. See W. P. Risk and W. Lenth in "Optics Letters", V 12, p 993 (87); "Laser Focus World", p 42, March 1990; and J. P. Cuthberston and G. J. Dixon in "Optics Letters", V 16, p 396 (91).

Figure 4D:
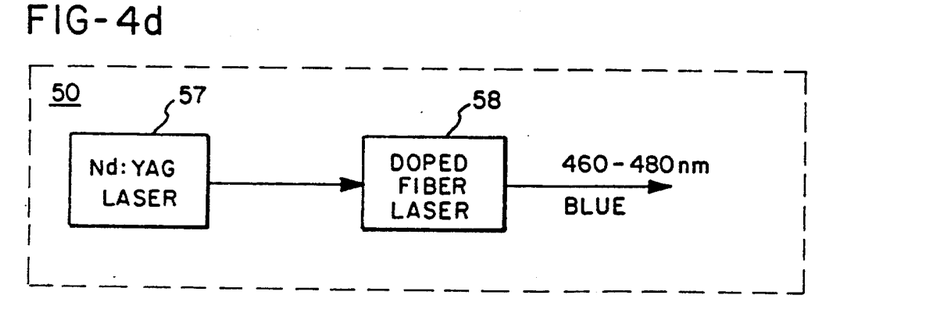

Finally, a fourth alternate method for producing a blue laser light is shown in the FIG. 4d block diagram. This is identical to the fourth alternate method for producing a green laser light discussed earlier, except that the doped fiber laser 58 is made to operate at 460-480 nm to produce the blue light. A diode pumped Nd: YAG laser 57 is used to pump the doped fiber laser 58. As a further variation, a diode may be used to pump the fiber laser 58 in place of the Nd: YAG diode laser 57. The doped fiber laser 58 would be similar to the fiber laser used earlier for producing green light, and is discussed in the following references: T. Hebert et al in "App. Phy. Lett." 60, p 2592 (92); S. G. Grubb et al in "Electronics Lett." 28, p 1243 (92); and "Laser Focus World", p 11, May 1992.

Figure 5:
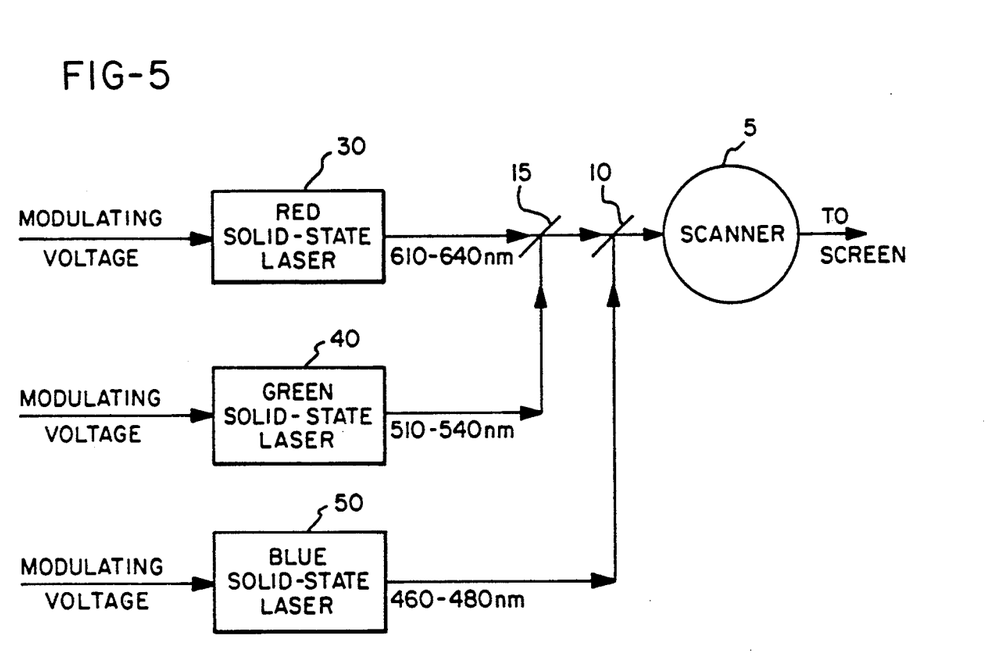
FIG. 5 is a block diagram of an alternate embodiment of the invention solid-state color laser projector system.

Referring now to FIG. 5, a block diagram of an alternate solid-state color laser projector system is shown. In this system, there are no separate modulators required as is the case for the preferred embodiment. The system comprises a scanner means 5, a first combiner means 10, a second combiner means 15, a red solid-state laser means 30, a green solid-state laser means 40 and a blue solid-state laser means 50.

A modulating voltage/current is connected to the input of each of the solid-state laser means 30, 40, 50, which directly causes the red laser means 30 to produce a red laser beam of 610-640 nm wavelength; the green laser means 40 to produce a green laser beam around 510-540 nm wavelength; and the blue laser means 50 to produce a blue laser beam around 460-480 nm wavelength.

The laser beams of the red laser means 30 and the green laser means 40 are directed at a second combiner means 15, where the light beams are combined and the resulting light is directed at a first combiner means 10. The laser output of the blue laser means 50 is directed at the first combiner means 10 where it is combined with the red/green light, and the resulting combination of red, green and blue laser light is directed to a scanner means 5. The scanner means 5 operates to produce a laser beam output for a screen or other equipment.

As in the case of the preferred embodiment (FIG. 1), a conventional scanner and conventional combiners may be used. The solid-state lasers that would be employed for the laser means include all those methods described earlier herein for FIGS. 2, 3a-3d and 4a-4d, and do not need to be further described.

In considering the differences between the preferred embodiment system shown in FIG. 1 and the alternate system of FIG. 5, it is apparent that the alternate system has the advantage of having less components, and may therefore take up less volume than the preferred system. It may also be more efficient in power use.

On the other hand, a modulating voltage source input is required for the alternate system, adding to the requirement and complexities of the external support. These are tradeoffs which should be borne in mind when considering applications for the proposed systems.

With regard to the possible applications of the proposed laser projector system, it should be noted that 0.5 watt to 1 watt power has been produced for the solid state lasers described herein, permitting its use on relatively small screens. One watt of total power would allow projection on screens of approximately 10 sq. ft., dependent on environmental factors. Correspondingly larger screens could be utilized with greater laser power output.

Rapid improvement in laser diode technology within the next few years is expected to achieve powers of greater than one watt for each of the colors red, green and blue. However, until all the improved solid-state laser colors are available in the market place, it is conceivable that a hybrid laser projector system could be used with say a red solid-state laser diode, and Argon ion lasers for the blue and green components. This could provide a practical intermediate step toward an all solid-state laser projector system in accordance with this invention.

In addition to the advantages of power efficiency and size, the solid state lasers have the advantage of requiring minimal or no maintenance as compared with the current state of-the- art Argon ion based projectors. For these reasons, it is believed that solid state based laser projectors as described herein, will become most practicable and eminently suitable for incorporation in large console home television sets and similar equipments in the near future.

From the foregoing description, it is apparent that the described embodiments achieve the objects of the present invention. Various modifications of the embodiments depicted will be apparent to those skilled in the art. These and other alternatives are considered to be equivalent and within the spirit and scope of the present invention.

Having described the invention, what is claimed is:

1. A full color solid-state laser projector system comprising:
   a red solid-state laser means based upon semiconductor lasers operating to produce a light beam at a proximate 610-640 nm wavelength;
   a red light modulator means; said red light modulator means receiving the laser light produced by said red solid-state laser means and operating to produce a red laser beam;
   a green solid-state laser means based upon semiconductor lasers operating to produce a light beam at a proximate 510-540 wavelength;
   a green light modulator means; said green light modulator means receiving the laser light produced by said green solid-state laser means and operating to produce a green laser beam;

a blue solid-state laser means based upon semiconductor lasers operating to produce a light beam at a proximate 460–480 nm wavelength;

a blue light modulator means; said blue light modulator means receiving the laser light produced by said blue solid-state laser means and operating to produce a blue laser beam;

a first combiner means and a second combiner means, and a scanner means;

said second combiner means receiving said red and green laser beams produced by said red and green modulator means, and combining said beams to produce a red/green laser beam directed at said first combiner means;

said first combiner means receiving said blue laser beam produced by said blue modulator means, and combining said blue laser beam with said red/green laser beam to produce a combination of red, green and blue laser light which is directed at said scanner means;

said scanner means receiving said combination laser light and operating to produce a laser beam output for a screen or other equipment.

2. The laser projector system as recited in claim 1, wherein said red solid-state laser means includes a CW type, Indium/ Gallium/ Phosphor (In Ga P) diode laser operating at a proximate wavelength of 610–640 nm.

3. The laser projector system as recited in claim 1, wherein said green solid-state laser means includes a CW type, Zinc/ Selenium (Zn Se) diode laser operating at a a proximate wavelength of 510–530 nm.

4. The laser projector system as recited in claim 1, wherein said green solid-state laser means includes and comprises:

a CW type, Gallium/ Aluminum/ Arsenic (Ga Al As) diode laser operating at a proximate wavelength of 800 nm;

a Neodymium/ Yttrium/ Aluminum/ Garnet (Nd: YAG) laser; said Nd: YAG laser being pumped by the output of said Ga Al As diode laser to produce a laser output beam having a proximate wavelength of 1064 nm; and a frequency doubler means;
said frequency doubler operating on the laser output beam of said Nd: YAG laser and producing a green laser beam having a proximate wavelength of 532 nm.

5. The laser projector system as recited in claim 1, wherein said green solid-state laser means includes and comprises:

a CW type, Gallium/ Aluminum/ Arsenic (Ga Al As ) diode laser operating at a proximate wavelength of 800 nm; and a Neodymium/ Yttrium/ Aluminum/ Borate (Nd: YAB) laser;
said Nd: YAB laser being pumped by said Ga Al As laser and operating to produce a green laser beam having a proximate wavelength of 531 nm.

6. The laser projector system as recited in claim 1, wherein said green solid-state laser means includes and comprises:

a CW type, Neodymium/ Yttrium/ Aluminum/ Garnet (Nd: YAG) laser; and a doped glass fiber laser; said glass fiber laser being doped with a suitable lanthanide such as Praseodymium (Pr) or Erbium (Er); said glass fiber laser being pumped by Nd: YAG laser to produce a green laser beam having a proximate wavelength of 510–540 nm.

7. The laser projector system as recited in claim 1, wherein said blue solid-state laser means includes a CW type, Zinc/ Selenium (Zn Se) diode laser operating at a proximate wavelength of 460–480 nm.

8. The laser projector system as recited in claim 1, wherein said blue solid-state laser means includes and comprises:

a CW type, Indium/ Gallium/ Arsenic (In Ga As) diode laser operating at a proximate wavelength of 920–980 nm; and a frequency doubler means;
said frequency doubler operating on the laser output beam of said In GA As laser and producing a blue laser beam having a proximate wavelength of 460–490 nm.

9. The laser projector system as recited in claim 1, wherein said blue solid-state laser means includes and comprises:

a CW type, Gallium/ Aluminum/ Arsenic (Ga Al As) diode laser operating at a proximate wavelength of 800 nm;

a Neodymium/ Yttrium/ Aluminum/ Garnet (Nd: YAG) laser; said Nd: YAG laser being pumped by the output of said Ga Al As diode laser to produce a laser output beam having a proximate wavelength of 946 nm; and a frequency doubler means; said frequency doubler operating on the laser output beam of said Nd: YAG laser and producing a blue laser beam having a proximate wavelength of 473 nm.

10. The laser projector system as recited in claim 1, wherein said blue solid-state laser means includes and comprises:

a CW type, Neodymium/ Yttrium/ Aluminum/ Garnet (Nd: YAG) laser; and a doped glass fiber laser; said glass fiber laser being doped with a suitable lanthanide such as Praseodymium (Pr) or Erbium (Er); said glass fiber laser being pumped by said Nd: YAG laser to produce a blue laser beam having a proximate wavelength of 460–480 nm.

11. A full color solid-state laser projector system comprising:

a red solid-state laser means based upon semiconductor lasers, having a modulating voltage/current input signal and producing a red laser beam at a proximate 610–640 nm wavelength;

a green solid-state laser means based upon semiconductor lasers, having a modulating voltage/current input signal and producing a green laser beam at a proximate 510–540 nm wavelength;

a blue solid-state laser means based upon semiconductor lasers, having a modulating voltage/current input signal and producing a blue laser beam at a proximate 460–480 nm wavelength;

a first combiner means and a second combiner means; and a scanner means;

said second combiner means receiving said red and green laser beams produced by said red and green solid-state laser means, and combining said laser beams to produce a red/green laser beam directed at said first combiner means;

said first combiner means receiving said blue laser beam produced by said blue solid-state laser means, and combining said blue laser beam with said red-/green laser beam to produce a combination of red, green and blue laser light which is directed at said scanner means;

said scanner means receiving said combination laser light and operating to produce a laser beam output for a screen or other equipment.

12. The laser projector system as recited in claim 11, wherein said red solid-state laser means includes a CW type, Indium/ Gallium/ Phosphor (In Ga P) diode laser operating at a proximate wavelength of 610–640 nm.

13. The laser projector system as recited in claim 11, wherein said green solid-state laser means includes a CW type, Zinc/ Selenium (Zn Se) diode laser operating at a proximate wavelength of 510–530 nm.

14. The laser projector system as recited in claim 11, wherein said green solid-state laser means includes and comprises:

a CW type, Gallium/ Aluminum/ Arsenic (Ga Al As) diode laser operating at a proximate wavelength of 800 nm;

a Neodymium/ Yttrium/ Aluminum/ Garnet (Nd: YAG) laser; said Nd: YAG laser being pumped by the output of said Ga Al As diode laser to produce a laser output beam having a proximate wavelength of 1064 nm; and a frequency doubler means;

said frequency doubler operating on the laser output beam of said Nd: YAG laser and producing a green laser beam having a proximate wavelength of 532 nm.

15. The laser projector system as recited in claim 11, wherein said green solid-state laser means includes and comprises:

a CW type, Gallium/ Aluminum/ Arsenic (Ga Al As) diode laser operating at a proximate wavelength of 800 nm; and a Neodymium/ Yttrium/ Aluminum/ Borate (Nd: YAB) laser;

said Nd: YAB laser being pumped by said Ga Al As laser and operating to produce a green laser beam having a proximate wavelength of 531 nm.

16. The laser projector system as recited in claim 11, wherein said green solid-state laser means includes and comprises:

a CW type, Neodymium/ Yttrium/ Aluminum/ Garnet (Nd: YAG) laser; and a doped glass fiber laser; said glass fiber laser being doped with a suitable lanthanide such as Praseodymium (Pr) or Erbium (Er); said glass fiber laser being pumped by said Nd: YAG laser to produce a green laser beam having a proximate wavelength of 510–540 nm.

17. The laser projector system as recited in claim 11, wherein said blue solid-state laser means includes a CW type, Zinc/ Selenium (Zn Se) diode laser operating at a proximate wavelength of 460–480 nm.

18. The laser projector system as recited in claim 11, wherein said blue solid-state laser means includes and comprises:

a CW type, Indium/ Gallium/ Arsenic (In Ga As) diode laser operating at a proximate wavelength of 920–980 nm; and a frequency doubler means;

said frequency doubler operating on the laser output beam of said In GA As laser and producing a blue laser beam having a proximate wavelength of 460–490 nm.

19. The laser projector system as recited in claim 11, wherein said blue solid-state laser means includes and comprises:

a CW type, Gallium/ Aluminum/ Arsenic (Ga Al As) diode laser operating at a proximate wavelength of 800 nm;

a Neodymium/ Yttrium/ Aluminum/ Garnet (Nd: YAG) laser; said Nd: YAG laser being pumped by the output of said Ga Al As diode laser to produce a laser output beam having a proximate wavelength of 946 nm; and a frequency doubler means;

said frequency doubler operating on the laser output beam of said Nd: YAG laser and producing a blue laser beam having a proximate wavelength of 473 nm.

20. The laser projector system as recited in claim 11, wherein said blue solid-state laser means includes and comprises:

a CW type, Neodymium/ Yttrium/ Aluminum/ Garnet (Nd: YAG) laser; and a doped glass fiber laser; said glass fiber laser being doped with a suitable lanthanide such as Praseodymium (Pr) or Erbium (Er); said glass fiber laser being pumped by said Nd: YAG laser to produce a blue laser beam having a proximate wavelength of 460–480 nm.

* * * * *